(12) United States Patent
Choi et al.

(10) Patent No.: US 9,547,896 B2
(45) Date of Patent: Jan. 17, 2017

(54) LESION CLASSIFICATION APPARATUS, AND METHOD OF MODIFYING LESION CLASSIFICATION DATA

(71) Applicants: SAMSUNG ELECTRONICS CO., LTD., Suwon-si (KR); Korea Advanced Institute of Science and Technology, Daejeon (KR)

(72) Inventors: Choong-hwan Choi, Suwon-si (KR); Yong-man Ro, Daejeon (KR); Seong-ho Chang, Yongin-si (KR); Woo-sup Han, Yongin-si (KR); Seong-tae Kim, Daejeon (KR); Min-cheol Park, Bucheon-si (KR); Do-kwan Oh, Suwon-si (KR); Byeong-won Lee, Pyeongtaek-si (KR)

(73) Assignees: SAMSUNG ELECTRONICS CO., LTD., Suwon-si (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 116 days.

(21) Appl. No.: 14/287,817

(22) Filed: May 27, 2014

(65) Prior Publication Data
US 2014/0348387 A1 Nov. 27, 2014

(30) Foreign Application Priority Data

May 24, 2013 (KR) .......................... 10-2013-0059264

(51) Int. Cl.
*G06K 9/00* (2006.01)
*G06T 7/00* (2006.01)

(52) U.S. Cl.
CPC .... *G06T 7/0012* (2013.01); *G06T 2207/10116* (2013.01); *G06T 2207/20081* (2013.01); *G06T 2207/30068* (2013.01)

(58) Field of Classification Search
None
See application file for complete search history.

(56) References Cited

U.S. PATENT DOCUMENTS

| | | | | |
|---|---|---|---|---|
| 5,970,164 A | * | 10/1999 | Bamberger | G06T 5/40 378/37 |
| 6,185,320 B1 | * | 2/2001 | Bick | G06K 9/482 382/132 |
| 7,203,350 B2 | * | 4/2007 | Leichter | G06K 9/033 378/21 |
| 7,529,394 B2 | * | 5/2009 | Krishnan | G06F 19/321 128/922 |
| 8,331,636 B2 | * | 12/2012 | Shinagawa | G06T 7/0012 382/128 |

(Continued)

*Primary Examiner* — Shervin Nakhjavan
(74) *Attorney, Agent, or Firm* — Sughrue Mion, PLLC (57) ABSTRACT

A method of and apparatus for changing lesion classification data, the method including determining whether at least one mass is included in an image of an object, determining whether the at least one mass corresponds to a lesion by using first data including at least one first information, selecting a false negative (FN) mass which has been determined as not corresponding to the lesion among the at least one mass, based on a first input, and changing the first data to second data by using second information of the selected FN mass.

19 Claims, 6 Drawing Sheets

(56) References Cited

U.S. PATENT DOCUMENTS

| | | | |
|---|---|---|---|
| 2002/0097902 A1* | 7/2002 | Roehrig | A61B 6/032 382/132 |
| 2004/0184644 A1* | 9/2004 | Leichter | G06K 9/033 382/128 |
| 2011/0044521 A1* | 2/2011 | Tewfik | G06K 9/6206 382/131 |
| 2012/0314949 A1* | 12/2012 | Grady | G06T 7/0081 382/173 |

* cited by examiner

LESION CLASSIFICATION APPARATUS, AND METHOD OF MODIFYING LESION CLASSIFICATION DATA

CROSS-REFERENCE TO RELATED PATENT APPLICATION

This application claims the benefit of Korean Patent Application No. 10-2013-0059264, filed on May 24, 2013, in the Korean Intellectual Property Office, the disclosure of which is incorporated herein in its entirety by reference.

BACKGROUND

1. Field

Apparatuses and methods consistent with exemplary embodiments relate to a lesion classification apparatus and a method of modifying lesion classification data.

2. Description of the Related Art

Breast cancer occurs to 8% of women during their lifetime. Currently, the most effective method of screening for breast cancer is through examination of a mammography image obtained by using an X-ray.

The mammography image may include a mass, and the examiner determines whether the detected mass in the mammography image corresponds to a lesion.

The accuracy of the analysis on the mammography image depends on the examiner's experience or knowledge, and in the case of a well-trained examiner, the accuracy rate is about 65 to 75%.

An apparatus for analyzing a mammography image to determine whether a lesion exists in the mammography image is called a computer-aided diagnosis (CADx) or a lesion classification apparatus, and when the examiner is aided by the lesion classification apparatus, the accuracy rate of the analysis may be enhanced.

Therefore, there is a need for an efficient solution for enhancing the accuracy of the analysis of the mammography image by enhancing the performance of the lesion classification apparatus.

SUMMARY

The exemplary embodiments provide a lesion classification apparatus having an improved performance by changing lesion classification data of the lesion classification apparatus using feature information of a lesion extracted from a false negative (FN) mass.

According to an aspect of an exemplary embodiment, there is provided a method of changing lesion classification data, including: determining at least one mass which is included in an image of an object; determining whether the at least one mass corresponds to a lesion by using first data including at least one first information ; selecting a false negative (FN) mass from among the at least one mass based on a first input, wherein the selected FN mass has been determined as not corresponding to the lesion; and changing the first data to second data by using second lesion feature information of the selected FN mass.

The changing may include adding the second information to the first data.

The changing may include deleting one of the at least one first information, and adding the second information to the first data.

The changing may include determining whether to change the first data to the second data by comparing lesion classification performance of the first data with lesion classification performance of the second data.

The selecting of the FN mass may include receiving a selection of a first region of the image; and selecting a mass included in the first region as the FN mass.

The receiving of the selection may include displaying a lesion probability of the selected mass included in the first region.

The selecting of the mass included in the first region a includes selecting one of a plurality of masses included in the first region as the FN mass, based on lesion probabilities of the plurality of masses.

The selecting of the FN mass may further include determining a border of the FN mass; and extracting the second information from the selected FN mass.

The determining of the border of the FN mass may include receiving a second input that selects the border of the FN mass; and determining the border of the FN mass based on the second input.

The determining of the border of the FN mass may include determining the border of the FN mass by using a border extraction algorithm.

The determining of the border of the FN mass may include changing brightness values of pixels included in the first region to a first brightness value or a second brightness value, based on a threshold brightness value and determining the border as outlined by the pixels changed to the first brightness value or the second brightness value using a border extraction algorithm.

The method of changing the lesion classification data may be performed by a sparse representation (SR) lesion classification apparatus, and the first data may include a dictionary of the SR lesion classification apparatus.

According to another aspect of an exemplary embodiment, there is provided a non-transitory computer-readable recording medium having recorded thereon a computer program for implementing the method of the above aspect.

According to another aspect of an exemplary embodiment, there is provided a lesion classification apparatus including a mass determination unit configured to determine at least one mass included in an image of an object; a lesion classification classifier configured to determine whether the at least one mass corresponds to a lesion by using first data including at least one first information o; a false negative (FN) mass selector configured to select a FN mass from among the at least one mass based on a first input, wherein the selected FN mass has been determined as not corresponding to the lesion; and a change unit configured to change the first data to a second data by using a second information of the FN mass.

The change unit may be configured to add the second information to the first data.

The change unit may be configured to delete any one of the at least one first information, and may be configured to add the second information to the first data.

The change unit may be configured to determine whether to change the first data to the second data by comparing lesion classification performance of the first data with lesion classification performance of the second data.

The lesion classification apparatus may further include a display configured to display the image, wherein the FN mass selector may be configured to receive a selection of a first region of the image displayed in the display, and select a mass included in the first region as the FN mass.

The display may be configured to display a lesion probability of the mass included in the first region to the user.

The FN mass selector may be configured to select one of a plurality of masses included in the first region as the FN mass, based on lesion probabilities of the plurality of masses.

The FN mass selector may be configured to determine a border of the FN mass, and may be configured to extract the second information from the determined border of the FN mass.

The FN mass selector may be configured to receive a second input that selects the border of the FN mass, and may be configured to determine the border of the FN mass based on the second input.

The FN mass selector may be configured to determine the border of the FN mass by using a border extraction algorithm.

The FN mass selector may be configured to change brightness values of pixels included in the first region to a first brightness value or a second brightness value, based on a threshold brightness value, and may be configured to determine the border as outlined by the pixels changed to the first brightness value or the second brightness value using a border extraction algorithm.

According to yet another aspect of an exemplary embodiment, there is provided a method of selecting a false negative (FN) mass, including receiving a selection of a first region of an image; determining lesion probabilities of a plurality of masses in the first regions; and selecting a mass from at last one mass included in the first region, based on the lesion probabilities of the plurality of masses.

The selecting the FN mass may include determining a border of the selected mass.

The determining the border of the selected mass may include receiving an input that selects the border of the mass, wherein the input determines the border of the mass.

The determining the border of the selected mass may include determining the border of the mass by using a border extraction algorithm.

The first lesion classification apparatus may include a sparse representation (SR) lesion classification apparatus, and the first data may include a dictionary of the SR lesion classification apparatus.

According to another aspect of an exemplary embodiment, there is provided a method of selecting a false negative (FN) mass, including receiving a user's selection of a first region of an image, determining lesion probabilities of a plurality of masses in the first regions, and selecting a mass from at least one mass included in the first region, based on the lesion probabilities of the plurality of masses.

The selecting of the FN mass may further include determining a border of the selected masses.

The determining of the border of the selected mass may include receiving a user input that selects the border of the mass, where the user input determines the border of the mass.

The determining of the border of the selected mass may include determining the border of the mass by using a border extraction algorithm.

BRIEF DESCRIPTION OF THE DRAWINGS

The above and other features and advantages of the exemplary embodiments will become more apparent with reference to the attached drawings in which.

DETAILED DESCRIPTION

Exemplary embodiments will now be described more fully with reference to the accompanying drawings. The exemplary embodiments, however, may be embodied in many different forms and should not be construed as being limited to the embodiments set forth herein; rather, these exemplary embodiments are provided so that this disclosure will be thorough and complete, and will fully convey the concept of the disclosure to those skilled in the art. In the drawings, the thicknesses of layers and regions are exaggerated for clarity. Like reference numerals in the drawings denote like elements, and thus their descriptions will be omitted.

Expressions such as "at least one of," when preceding a list of elements, modify the entire list of elements and do not modify the individual elements of the list.

Hereinafter, the term "unit" refers to a software component, or a hardware component such as FPGA or ASIC, and performs a certain function. However, the "unit" is not limited to software or hardware. The "unit" may be configured in an addressable storage medium and may be configured to be executed by one or more processors. Hence, the "unit" includes elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements and the units may be combined into a fewer number of elements and units or may be divided into a larger number of elements and units.

Furthermore, "image" may refer to multi-dimensional data composed of discrete image elements (e.g., pixels in a two-dimensional image and voxels in a three-dimensional image). For example, an image may include a medical image of an object acquired by an X-ray, CT, MRI, ultrasonic waves or another medical image photographing apparatus.

Furthermore, "object" may include a person or an animal, or a part of a person or an animal. For example, the object may include the liver, the heart, the womb, the brain, the breast, the abdomen, or a blood vessel. Furthermore, the "object" may include a phantom. The phantom refers to materials having a volume very close to density of a life and the valid atom number and may include a phantom of a sphere having attributes similar to those of a body.

Furthermore, "user" refers to a medical professional such as a doctor, a nurse, a medical laboratory technologist, and an engineer who repairs a medical apparatus, but the user is not limited thereto.

Furthermore, "lesion" refers to an abnormal state of a body generated by a disease, and may include a malignant tumor, cancer, etc.

Figure 1:
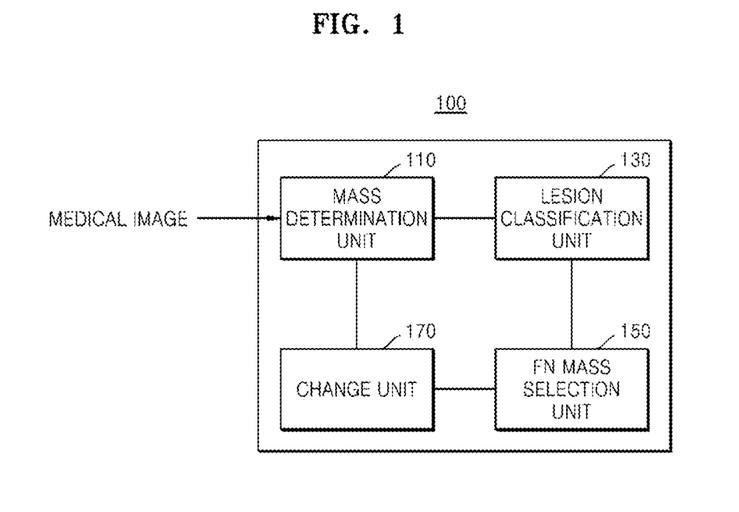
FIG. 1 is a block diagram showing a configuration of a lesion classification apparatus according to an exemplary embodiment.

FIG. 1 is a block diagram illustrating a configuration of a lesion classification apparatus 100 according to an exemplary embodiment.

Referring to FIG. 1, the lesion classification apparatus 100 according to an exemplary embodiment may include a mass determination unit 110, a lesion classification unit 130 (i.e., classifier), a false negative (FN) mass selection unit 150 (i.e., selector), and a change unit 170.

The mass determination unit 110, the lesion classification unit 130, the FN mass selection unit 150, and the change unit 170 may be configured as a microprocessor. Furthermore, although not illustrated in FIG. 1, the lesion classification apparatus 100 according to an exemplary embodiment may further include a display that outputs a medical image (i.e., image).

The mass determination unit 110 determines at least one mass included in a medical image of an object. The mass determination unit 110 may receive the medical image of the object from an external server or an external medical device, and may also receive a medical image stored in a memory unit (not shown). Furthermore, a medical image of an object photographed by a medical image photographing unit (not shown) included in the lesion classification apparatus 100 may be received. The medical image according to an exemplary embodiment may include a medical image for the chest, the abdomen, the head, etc., generated by other medical imaging apparatuses such as a computed tomography (CT) imaging system and a magnetic resonance imaging (MRI) system, as well as a X-ray image for the breast.

The mass determination unit 110 may include a preprocessor that regulates a contrast or brightness of the received medical image, and the mass determination unit 110 may determine at least one mass from the preprocessed medical image. The object of the preprocessing is to clarify the form of the object by highlighting the brightness difference between the mass and the surrounding background included in the medical image.

In the medical image, the mass is a region brighter than the surrounding region, may have almost constant density, and may have a certain shape having various sizes. At least one mass determined by the mass determination unit 110 may include a mass which is suspected as a lesion and may also include a mass which is actually not a lesion, because a mass not detected by the mass determination unit 110 is not a target for analysis in the future.

The mass determination unit 110 may determine at least one mass from a medical image by using an algorithm such as a fuzzy technique, a bilateral image subtraction, or a multiscale technique. The fuzzy technique, the bilateral image subtraction, and the multiscale technique are obvious to those skilled in the art, and thus the detailed descriptions thereof are omitted here.

The lesion classification unit 130 determines whether at least one mass determined by the mass determination unit 110 corresponds to a lesion by using first lesion classification data including at least one set of first lesion feature information obtained from a training mass. Here, the training mass is included in a training image, and may include a mass which has been previously determined as corresponding to a lesion.

The first lesion classification data may include at least one of lesion feature information extracted from a training mass corresponding to the lesion and normal feature information extracted from a training mass which does not correspond to the lesion. The lesion classification unit 130 determines whether at least one mass determined by the mass determination unit 110 is a lesion by using at least one of lesion feature information of the training mass corresponding to the lesion and normal feature information of the training mass which does not correspond to the lesion. The feature information of a mass may include features or feature vectors of the mass which indicate the shape, the size, the density, the smoothness of border, etc., or may include mass feature related information generated based on the features of the mass.

The lesion classification apparatus 100 according to an exemplary embodiment may include a sparse representation (SR) lesion classification apparatus, and the lesion classification data may include a dictionary of the SR lesion classification apparatus.

The SR technique expresses predetermined data as a linear combination of atoms included in the dictionary. Equation 1 below shows a dictionary including lesion feature information and normal feature information.

$$\text{Dictionary} = \{pi|i=1 \text{ to } N\}, \{pj|j=1 \text{ to } N\} \quad \text{[Equation 1]}$$

In Equation 1, "pi" refers to lesion feature information extracted from a training mass corresponding to a lesion, and "pj" refers to normal feature information extracted from a training mass which does not correspond to the lesion. Furthermore, "i" and "j" respectively refer to the index of lesion feature information and the index of normal feature information. The dictionary of Equation 1 includes N sets of lesion feature information and N sets of normal feature information.

The SR lesion classification apparatus expresses the mass included in the medical image as a linear combination of lesion feature information and a linear combination of normal feature information. The SR lesion classification apparatus acquires a first difference value between the linear combination of the lesion feature information and the feature information of the mass included in the medical image, and a second difference value between the linear combination of the normal feature information and the feature information of the mass included in the medical image.

Thereafter, if the first difference value is smaller than the second difference value, the SR lesion classification apparatus determines that the mass included in the medical image is a lesion, and, if the second difference value is smaller than the first difference value, the SR lesion classification apparatus determines that the mass included in the medical image is not a lesion.

Furthermore, a false positive (FP) mass refers to a mass which has been determined as a lesion by the lesion classification unit 130, but is actually not a lesion, a false negative (FN) mass refers to a mass which has been determined as not being a lesion by the lesion classification unit 130, but is actually a lesion. Furthermore, a true positive (TP) mass refers to a mass which has been determined as a lesion by the lesion classification unit 130 and is actually a mass, and a true negative (TN) mass refers to a mass which has been determined as not being a lesion and is actually not a lesion.

The FN mass selection unit 150 selects a FN mass which has been determined from among one or more masses as not corresponding to a lesion, based on a user's input. Furthermore, the FN mass selection unit 150 may determine a border of the FN mass, and may extract second lesion feature information from the FN mass whose border has been determined. When the second lesion feature information of the FN mass has been already extracted by the lesion classification unit 130, the extracted second lesion feature information may be received from the lesion classification unit 130.

Furthermore, the lesion classification apparatus 100 according to an exemplary embodiment may be connected to an external biopsy device, and may receive information regarding a mass, which is determined by the biopsy device as being a lesion, from among masses which have been determined by the lesion classification unit 130 as not being lesions from the biopsy device and may select the mass as a FN mass.

The FN mass selection unit 150 selects the mass which has been determined as not corresponding to a lesion by the lesion classification unit 130, but has been determined as corresponding to a lesion through a user or biopsy, based on a user's input. The method of selecting the FN mass and the method of determining the border of the FN mass will be described later with reference to FIGS. 3A to 6.

The change unit 170 changes the first lesion classification data into the second lesion classification data by using the second lesion feature information extracted from the FN mass.

The change unit 170 may add the second lesion feature information to the first lesion classification data.

Furthermore, in order to prevent an excessive increase in the size of the first lesion classification data, the change unit 170 may delete one of one or more sets of first lesion feature information included in the first lesion classification data, and may add the second lesion feature information to the first lesion classification data. At this time, the change unit 170 determines which of the one or more sets of first lesion feature information to replace with the second lesion feature information, in order to achieve the largest increase in the lesion classification performance.

Equation 2 below shows a dictionary in which the second lesion feature information is added to the lesion feature information disclosed in Equation 1, and Equation 3 shows a dictionary in which one of the lesion feature information of Equation 1 is deleted and the second lesion feature information is added.

$$\text{Dictionary} = \{pi, a | i=1 \text{ to } N\}, \{pj | j=1 \text{ to } N\} \quad \text{[Equation 2]}$$

$$\text{Dictionary} = \{pi, a | i=1 \text{ to } N-1\}, \{pj | j=1 \text{ to } N\} \quad \text{[Equation 3]}$$

In Equation 2 and Equation 3 above, "a" refers to second lesion feature information extracted from the FN mass.

Furthermore, the change unit 170 may determine whether to replace the first lesion classification data with the second lesion classification data by comparing the lesion classification performance by using the first lesion classification data with the lesion classification performance by using the second lesion classification data. The lesion classification performance may include an AUC (area under the receiver operating characteristic).

Specifically, the change unit 170 determines whether a lesion exists for a medical image which already has information on the existence of a lesion by using the first lesion classification data and the second lesion classification data. Thereafter, TP determination rate for FP determination rate of each of the first lesion classification data and the second lesion classification data (i.e., receiver operating characteristic, ROC) is acquired, and the area of an ROC curve is calculated as the AUC for the first lesion classification data and the second lesion classification data.

As the AUC increases, the classification performance is enhanced, and thus when the AUC obtained by using the first lesion classification data is smaller than the AUC obtained by using the second lesion classification data, the change unit 170 changes the first lesion classification data to the second lesion classification data.

Furthermore, the change unit 170 may output performance regarding the first lesion classification data and the second lesion classification data through a display, and when receiving a change input from the user, the change unit 170 may change the first lesion classification data into the second lesion classification data.

The lesion classification apparatus 100 according to an exemplary embodiment may continually improve performance of the lesion classification apparatus by updating the lesion classification data by using the lesion feature information of the FN mass which has been determined as not being a lesion by the lesion classification apparatus 100.

Figure 2A:
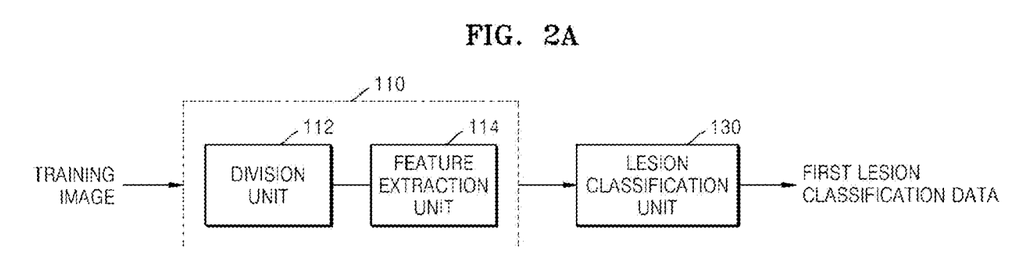
FIGS. 2A, FIG. 2B and FIG. 2C are diagrams showing respective functions of parts of the lesion classification apparatus of FIG. 1.
Figure 2B:
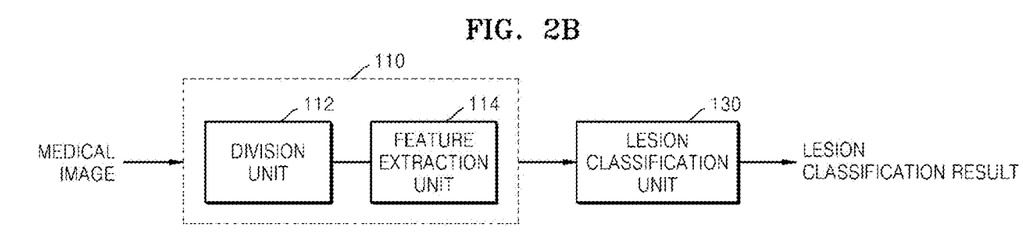
Figure 2C:
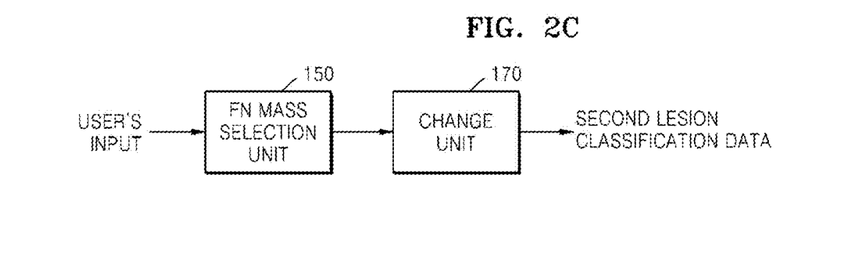

FIG. 2A, FIG. 2B and FIG. 2C are diagrams illustrating respective functions of parts of the lesion classification apparatus 100 of FIG. 1.

FIG. 2A is a diagram illustrating generation of first lesion classification data by using a training image by the mass determination unit 110 and the lesion classification unit 130 illustrated in FIG. 1. The mass determination unit 110 and the lesion classification unit 130 learn from a training image to generate first lesion classification data.

The mass determination unit 110 may include a division unit 112 and a feature extraction unit 114. A division unit 112 divides the training image into interest regions including a mass.

The feature extraction unit 114 extracts feature information of masses from masses included in respective interest regions.

The lesion classification unit 130 forms first classification data including at least one of lesion feature information and normal feature information by using feature information of masses.

FIG. 2B is a diagram illustrating acquisition of a lesion classification result through analysis on the medical image by the mass determination unit 110 and the lesion classification unit 130 illustrated in FIG. 1.

As illustrated in FIG. 2B, the mass determination unit 110 may include the division unit 112 and the feature extraction unit 114.

The division unit 112 divides a medical image into interest regions including masses. The feature extraction unit 114 extracts feature information of masses from masses included in respective interest areas.

The lesion classification unit 130 compares first lesion classification data with feature information of masses to generate a lesion classification result indicating whether masses included in respective interest areas correspond to a lesion, or a lesion probability.

FIG. 2C is a diagram illustrating a change of the first lesion classification data to the second lesion classification data by the FN mass selection unit 150 and the change unit 170 illustrated in FIG. 1.

The FN mass selection unit 150 selects an FN mass which has been determined as not being a lesion by the lesion classification unit 130, based on a user's input.

The change unit 170 changes the first lesion classification data into the second lesion classification data by using the second lesion feature information of the selected FN mass.

Figure 3A:
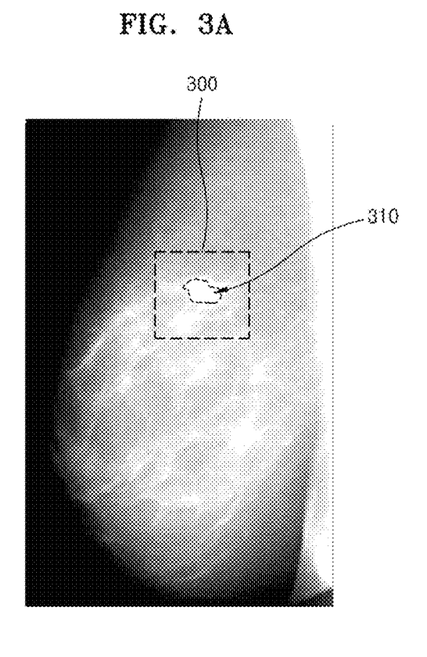
FIG. 3A is a diagram showing a medical image including a first region selected by a user.
Figure 3B:
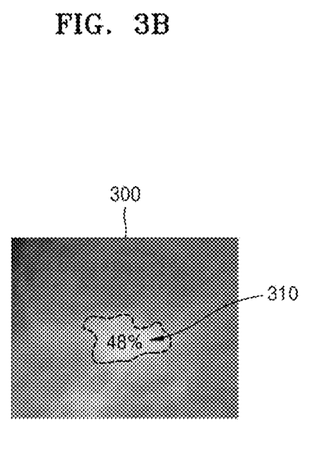
FIG. 3B is a diagram showing lesion probability of a mass included in the first region selected by the user.

FIG. 3A is a diagram illustrating a medical image including a first region 300 selected by the user, and FIG. 3B is a diagram illustrating a lesion probability of a FN mass 310 included in the first region 300 selected by the user. The medical image illustrated in FIG. 3A may be output through a display.

As described above, the FN mass selection unit 150 may select the FN mass which has been determined as not being a lesion by the lesion classification unit 130, based on a user's input.

As illustrated in FIG. 3A, when receiving a selection of the first region 300 including a predetermined mass 310 from the user, the FN mass selection unit 150 may determine that the mass 310 included in the first region 300 is an FN mass. The user may select the first region 300 by using an input device such as a mouse, a trackball, a keyboard, and a touch screen.

Furthermore, as illustrated in FIG. 3B, the FN mass selection unit 150 may display a lesion probability of the mass 310 included in the first region 300 selected by the user to the user. The lesion probability of the mass 310 included in the first region 300 may be determined by the lesion classification unit 130, and the user may determine whether the mass 310 selected by the user is appropriate for changing the first lesion classification data by checking the lesion probability of the mass 310 selected by the user.

Furthermore, the user may directly select an arbitrary mass 310 instead of the first region 300, and the FN mass selection unit 150 may determine that the mass 310 selected by the user is an FN mass. For example, when an arbitrary point is selected by the user in the medical image output through the display, the FN mass selection unit 150 may determine that the mass including the point is an FN mass.

Figure 4:
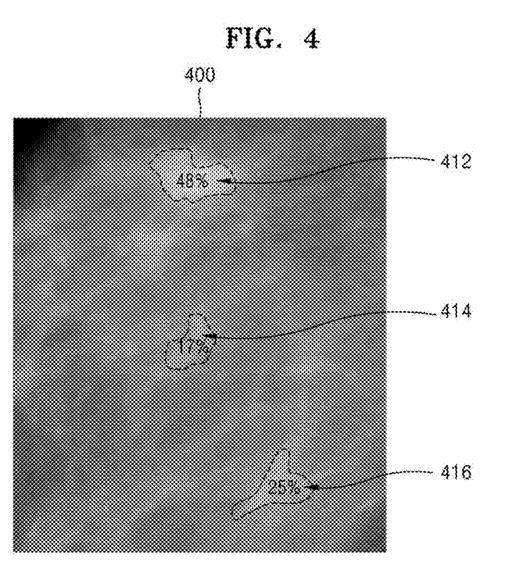
FIG. 4 is a diagram showing lesion probability of a plurality of masses included in the first region selected by the user.

FIG. 4 is a diagram illustrating lesion probability of a plurality of masses 412, 414, and 416 included in a first region 400 selected by the user.

As illustrated in FIG. 4, when the plurality of masses 412, 414, and 416 are included in the first region 400 selected by the user, one of a plurality of masses 412, 414, and 416 is determined as an FN mass, based on lesion probabilities of the plurality of masses 412, 414, and 416. This is because a mass having a relatively high lesion probability has a high probability of corresponding to the FN mass even among masses which have been determined as not being a lesion.

Among the plurality of masses illustrated in FIG. 4, the mass of reference numeral 412 has lesion probability of 48%, and this lesion probability is greater than the lesion probability of other masses 414 and 416, and thus the FN mass selection unit 150 may select the mass of reference numeral 412 as the FN mass.

Furthermore, when a plurality of masses 412, 414, and 416 are included in the first region 400 selected by the user, lesion probabilities of the plurality of masses is output through the display, and the FN mass selection unit 150 may select the mass selected by the user among the plurality of masses 412, 414, and 416, as the FN mass.

Figure 5:
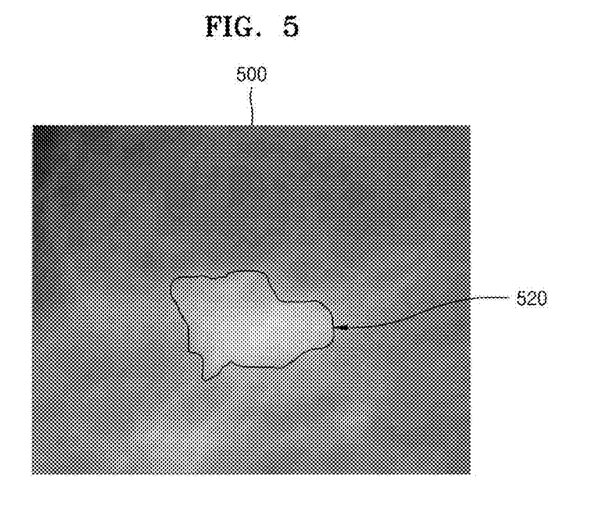
FIG. 5 is a diagram showing a method of determining a border of a false negative (FN) mass included in the first region selected by the user.

FIG. 5 is a diagram illustrating a method of determining a border 520 of a false negative (FN) mass included in the first region 500 selected by the user.

As described above, the FN mass selection unit 150 may determine the border of the FN mass, and may extract second lesion feature information from the border-determined FN mass.

The FN mass selection unit 150 may receive a user input that indicates the border 520 of the FN mass, and may determine the border 520 of the FN mass based on the user input. The user may input the border 520 of the FN mass by using an input device such as a keyboard, a mouse, a trackball, or a touch screen.

Furthermore, the FN mass selection unit 150 may determine the border 520 of the FN mass included in the first region 500 by using a border extraction algorithm.

Figure 6:
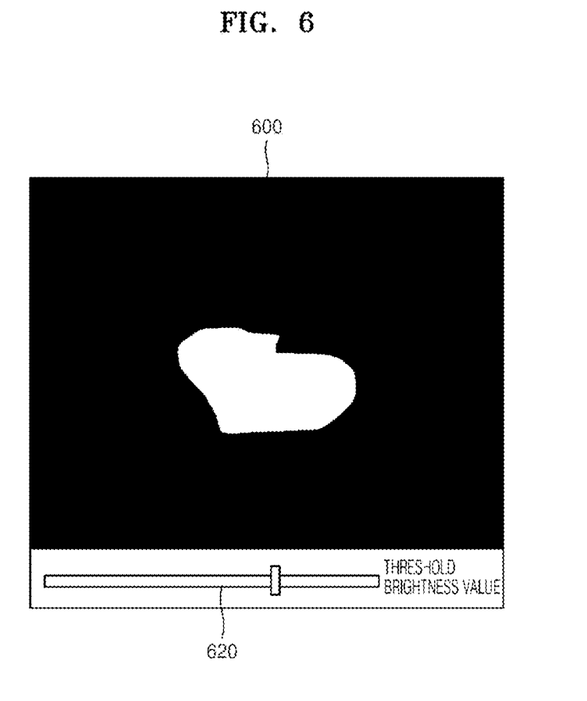
FIG. 6 is a diagram showing another method of determining the border of the FN mass included in the first region selected by the user.

FIG. 6 is a diagram illustrating another method of determining the border of the FN mass included in the first region selected by the user. A first region 600 and an adjustment bar 620 selected by the user may be output through a display.

The FN mass selection unit 150 may change brightness values of pixels included in the first region 600 selected by the user to a first brightness value or a second brightness value, based on a threshold brightness value input by the user, determine a border as outlined by the pixels by using the border extraction algorithm, and determine that the border of the pixels is the border of the FN mass. The first brightness value may be the maximum brightness value of the pixels of a medical image, and the second brightness value may be the minimum brightness value of the pixels of the medical image.

The user may more clearly distinguish the FN mass region included in the first region 600 from surrounding regions by using the adjustment bar 620 to set the threshold brightness value.

An image processing algorithm that is generally used to extract a border of an image in an image processing field, as well as a fuzzy technique, a bilateral image subtraction, or a multi-scale technique, may be used as the border extraction algorithm.

Figure 7:
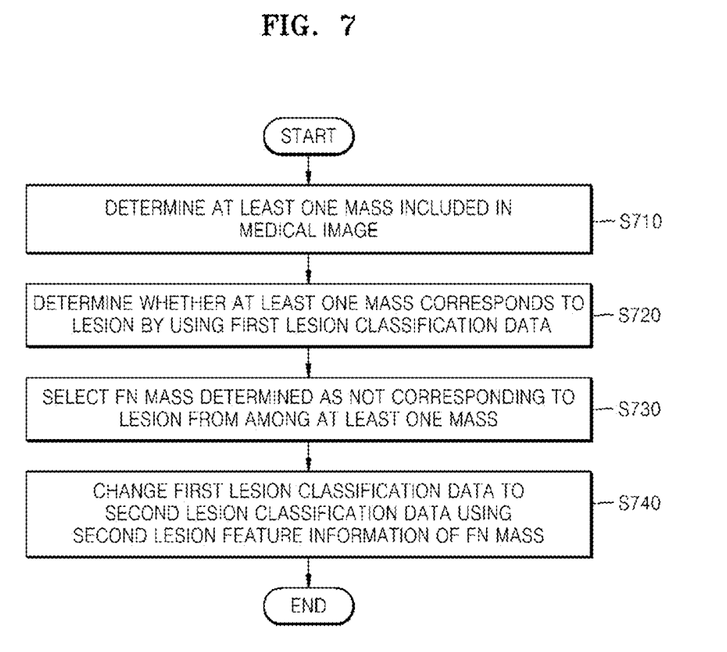
FIG. 7 is a flowchart showing a method of changing lesion classification data according to an exemplary embodiment.

FIG. 7 is a flowchart illustrating a method of changing lesion classification data according to an exemplary embodiment. Referring to FIG. 7, the method of changing lesion classification data according to an exemplary embodiment may include operations processed in a temporal order in the lesion classification apparatus 100 illustrated in FIG. 1. Hence, though omitted below, the description regarding the lesion classification apparatus 100 illustrated in FIG. 1 may be applied to the lesion classification data changing method of FIG. 7.

In operation S710, the lesion classification apparatus 100 determines at least one mass included in a medical image.

In operation S720, the lesion classification apparatus determines whether at least one of the determined masses corresponds to a lesion by using the first lesion classification data.

In operation S730, the lesion classification apparatus 100 selects an FN mass which is determined as not corresponding to a lesion from among one or more masses.

In operation S740, the lesion classification apparatus 100 changes the first lesion classification data to the second lesion classification data by using the second lesion feature information of the FN mass.

The methods and functions of the exemplary embodiments may be implemented in the form of a recording medium that includes computer executable instructions, such as program modules, being executed by a computer. Computer-readable media can be any available media that can be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is typically computer-readable instructions, and other data in a modulated data signal such as data structures, program modules, or carrier, or other transport mechanism and includes any information delivery media.

Examples of the computer readable recording medium include magnetic storage media (e.g., ROM, floppy disks, hard disks, etc.), optical recording media (e.g., CD-ROMs or DVDs), etc.

While exemplary embodiments have been particularly shown and described, it will be understood by those skilled in the art that various changes in form and details may be made therein without departing from the spirit and scope of the present invention as defined by the following claims. The exemplary embodiments should be considered in the descriptive sense only and not for purposes of limitation. Therefore, the scope of the invention is defined not by the detailed description but by the following claims, and all differences within the scope will be construed as being included in the present invention.

What is claimed is:

1. A method of changing lesion classification data, the method, performed at a lesion classification system including one or more processors, comprising:
   determining, by the one or more processors, at least one mass which is included in an image of an object;
   determining, by the one or more processors, whether the at least one mass corresponds to a lesion by using first data including at least one first information;
   selecting, by the one or more processors, in response to a user input, a false negative (FN) mass from among the at least one mass, wherein the selected FN mass is a mass previously determined as not corresponding to a lesion, and the user input indicates that the selected FN mass corresponds to a lesion; and
   changing, by the one or more processors, the first data to second data by using second information of the selected FN mass,
   wherein the second data is used for determining whether the at least one mass corresponds to a lesion.

2. The method of claim 1, wherein the changing comprises adding the second information to the first data.

3. The method of claim 1, wherein the changing comprises deleting one of the at least one first information, and adding the second information to the first data.

4. The method of claim 1, wherein the changing comprises determining whether to change the first data to the second data by comparing lesion classification performance of the first data with lesion classification performance of the second data.

5. The method of claim 1, wherein the selecting of the FN mass comprises:
   receiving a selection of a first region of the image; and
   selecting a mass included in the first region as the FN mass.

6. The method of claim 5, wherein the receiving of the selection comprises displaying a lesion probability of the selected mass included in the first region.

7. The method of claim 5, wherein the selecting of the mass included in the first region comprises:
   selecting one of a plurality of masses included in the first region as the FN mass, based on lesion probabilities of the plurality of masses.

8. The method of claim 5, wherein the selecting of the FN mass further comprises:
   determining a border of the FN mass; and
   extracting the second information from the selected FN mass.

9. The method of claim 8, wherein the determining of the border of the FN mass comprises:
   determining the border of the FN mass based on the user input.

10. The method of claim 8, wherein the determining of the border of the FN mass comprises:
    determining the border of the FN mass by using a border extraction algorithm.

11. The method of claim 8, wherein the determining of the border of the FN mass comprises:
    changing brightness values of pixels included in the first region to a first brightness value or a second brightness value, based on a threshold brightness value; and
    determining the border as outlined by the pixels changed to the first brightness value or the second brightness value using a border extraction algorithm.

12. The method of claim 1, wherein the method of changing the lesion classification data is performed by a sparse representation (SR) lesion classification apparatus, and the first data includes a dictionary of the SR lesion classification apparatus.

13. A non-transitory computer-readable recording medium having recorded thereon a computer program for implementing the method of claim 1.

14. A lesion classification system comprising:
    one or more processors configured to:
    determine at least one mass included in an image of an object;
    determine whether the at least one mass corresponds to a lesion by using first data including at least one first information;
    select, in response to a user input, a false negative (FN) mass from among the at least one mass, wherein the selected FN mass has been determined as not corresponding to the lesion and is determined as corresponding to the lesion; and
    change the first data to a second data by using a second information of the FN mass,
    wherein the second data is used for determination of the lesion.

15. The lesion classification system of claim 14, wherein the one or more processors are configured to add the second information to the first data.

16. The lesion classification system of claim 14, wherein the one or more processors are configured to delete one of the at least one first-information, and add the second information to the first data.

17. The lesion classification system of claim 14, wherein the one or more processors are configured to determine whether to change the first data to the second data by comparing lesion classification performance of the first data with lesion classification performance of the second data.

18. The lesion classification system of claim 14, wherein the lesion classification system further comprises a display configured to display the image,
    wherein the one or more processors are configured to receive a selection of a first region of the image displayed in the display, and selects a mass included in the first region as the FN mass.

19. The lesion classification system of claim 18, wherein the display is configured to display a lesion probability of the mass included in the first region to the user.

* * * * *